J. H. HAMMOND, Jr.
RADIODYNAMIC DIRECTIVE CONTROL SYSTEM.
APPLICATION FILED DEC. 15, 1913.

1,115,530.

Patented Nov. 3, 1914.

Witnesses:
Horace A. Crossman
Carl L. Choate

Inventor:
John Hays Hammond, Jr.
by Emery, Booth, Janney and Varney
Attys

UNITED STATES PATENT OFFICE.

JOHN HAYS HAMMOND, JR., OF GLOUCESTER, MASSACHUSETTS.

RADIODYNAMIC DIRECTIVE CONTROL SYSTEM.

1,115,530.  Specification of Letters Patent.  Patented Nov. 3, 1914.

Application filed December 15, 1913. Serial No. 806,674.

*To all whom it may concern:*

Be it known that I, JOHN HAYS HAMMOND, Jr., a citizen of the United States, and a resident of Gloucester, Massachusetts, have invented an Improvement in Radiodynamic Directive Control Systems, of which the following description, in connection with the accompanying drawings, is a specification, like characters on the drawings representing like parts.

This invention relates to radiodynamic directive control systems, and particularly to a system for indicating visually or in similitude the location of a body, which body is preferably a movable one and which may be a vessel.

Figure 1:
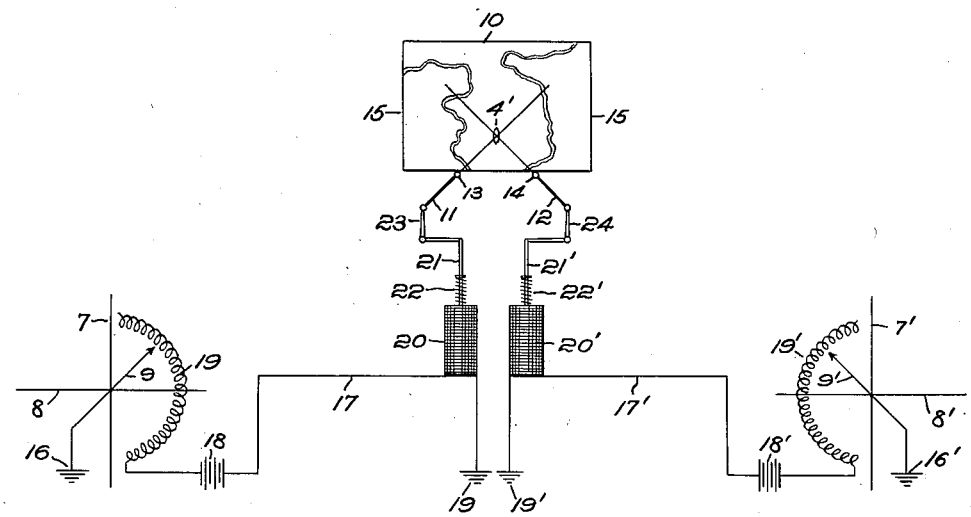
Figure 2:
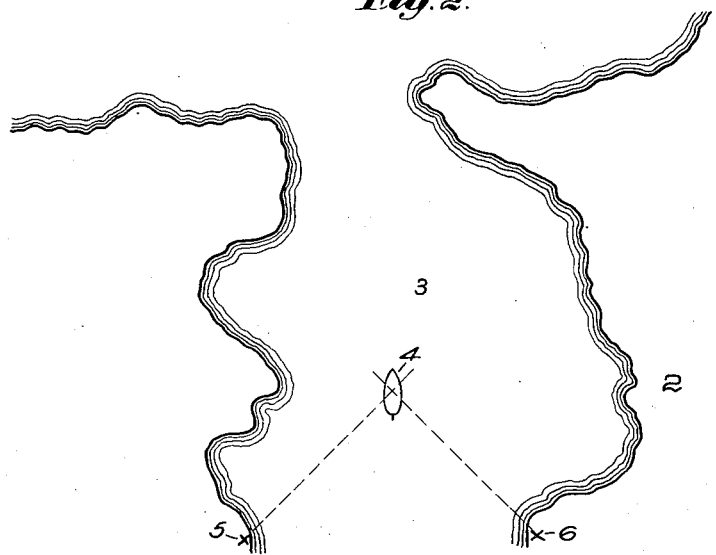

In order that the principle of the invention may readily be understood, I have disclosed a single embodiment thereof in the accompanying drawing, wherein:

Figure 1 is a diagrammatic representation of one embodiment of means for practising the invention; and Fig. 2 is a diagram indicating a position of the moving body and of means responsive to radiant energy for indicating the position of said body.

In accordance with my invention, I provide suitable means for indicating visually or in similitude or miniature the location of a body which is preferably a moving one, such for example as a torpedo or other vessel. The invention may, however, be adapted to other uses and for the purpose of indicating, preferably to the eye, the location of an object the position of which may change from time to time and which may be concealed from the eyes of those desiring to know the position thereof. Preferably I take advantage of signals transmitted or emitted from said body. Obviously the body to be located may be a vessel manned by a crew and which can transmit electromagnetic waves to be received by a distant control station. The signals may, however, be otherwise originated and may partake of any form of radiant energy. In the case of a torpedo which has been sent out from a control station or ship, the signals may be automatically generated in any suitable manner. For example, sound signals may automatically be generated from time to time upon the torpedo, and by suitable mechanism thereon be caused to act upon mechanism for transmitting electromagnetic waves so that upon the generation of each signal suitable electromagnetic waves are transmitted.

I shall describe that form of my invention wherein electro-magnetic waves are transmitted from a torpedo which may be enveloped in fog or the position of which, for other reasons, cannot readily be detected by an observer.

Referring more particularly to the drawing, I have in Fig. 2 indicated shore lines at 1 and 2, a body of water at 3, and a torpedo at 4, the position of which is to be indicated in similitude or miniature. Preferably at two points, 5 and 6, I position receiving apparatus for electromagnetic waves. Preferably such apparatus is one for directively receiving such waves and may be of the type devised by Messrs. Bellini and Tosi, one form whereof is set forth in their United States Patent No. 945,440, dated January 4, 1910. Each receiving apparatus preferably is provided with two fixed coils diagrammatically indicated at 7, 8 and 7', 8' and a third coil at 9, 9'. It is unnecessary to indicate in detail all parts of said apparatus or to set forth fully the action thereof. It is sufficient to state that when the electromagnetic waves or signals from the torpedo 4 reach the two receiving stations, oscillating currents are produced in the coils 7, 8 and 7', 8'. These oscillations compound to form a single magnetic field with a direction perpendicular to that from which the waves come. The strength of the induced current in the movable coils 9, 9' will depend upon its orientation with respect to the resultant magnetic field and will be at a maximum when the said movable coils are respectively in a position to embrace as many as possible of the lines of magnetic force. This optimum direction is perpendicular to the field and therefore parallel to the direction from which the waves are coming. Therefore, the said movable coils will, upon the receipt of electromagnetic waves, be turned to point toward the torpedo 4.

At some suitable point I preferably provide a chart or representation 10 of the field of movement of the torpedo 4, and upon or in suitable relation thereto, I mount or provide suitable means to indicate upon the chart the position of the torpedo 4. For this purpose I preferably provide two pointers, 11, 12, which are pivoted at suitable points, 13, 14, as upon the margin of the chart. Preferably the said pointers are symmetrically mounted; and I have herein represented them as mounted at points equally distant from the vertical edges 15 of the chart and spaced apart a distance substantially equaling that between their pivotal points and the respective adjacent vertical edges of the chart.

Each pointer 11, 12 is influenced by suitable means coacting with one of the receiving apparatus. Preferably for this purpose I provide two electric circuits, one of which is associated with and includes the pointer 11 and the receiving apparatus 7, 8, 9 and the other of which includes the pointer 12 and the receiving apparatus 7', 8', 9'. As indicated in Fig. 1, each movable coil 9 or 9' forms a portion of its described circuit and is connected to ground at 16, 16'. Each circuit 17, 17' is provided with a battery 18, 18' and a suitable resistance 19 and 19' along which the directive coils 9, 9' may move as indicated, so as in their movements to cut out or to add resistance to the said circuit 17, 17'. The said circuits 17, 17' are connected to earth at 19, 19' and are provided with suitable devices, such for example as solenoids 20, 20', the cores 21, 21' of which are provided with springs 22, 22' which tend to pull them downward or to depress them. The currents passing through the said circuits 17, 17' lift the said cores 21, 21' against the stress of said springs and thereby impart turning movement to the pointers 11 and 12, being for this purpose connected thereto in any suitable manner as by means of suitably connected links 23, 24.

The receiving devices are mounted as described so that the planes of direction of the movable coils 9, 9' intersect at the torpedo 4 and in moving into position determined by the position of the torpedo, they add to or take resistance from the circuits 17, 17'. The subtraction of resistance from the circuits strengthens the current therein and thus further lifts the cores 21, 21', thereby moving the indicating ends of the pointers 11, 12 downward and at their intersecting point 4' indicate the position of the torpedo. Conversely, the addition of resistance to the circuits 17, 17' lessens the current passing therethrough and hence the springs 22, 22' move the cores 21, 21' downwardly and thus elevate the indicating ends of the pointers and change their point of intersection 4'. Such change in position of the crossing point 4' of said pointers corresponds to the changes in position of the torpedo 4, and thus the position of said torpedo is at all times indicated visually upon the chart or representation 10, so that even though the torpedo be enveloped in fog or be submerged, or for other reasons be concealed from view or is difficult to follow visually, its location is at all times located upon the chart 10.

Obviously the chart or representation may be of any suitable character, it being merely desirable that the crossing or indicating point of the pointers convey to the eye and mind of the observer the actual position of the torpedo. It is not necessary that the pointers be of sufficient length as to actually intersect, although this is desirable.

Having thus described one illustrative embodiment of my invention, I desire it to be understood that although specific terms are employed, they are used in a generic and descriptive sense and not for purposes of limitation, the scope of the invention being set forth in the following claims:

1. In apparatus for representing in similitude the location of a body, a chart or representation of the field of movement thereof, means to indicate upon said chart or representation the position of said body, and means responsive to radiant energy transmitted from said body to move said indicating means in accordance with movements of said body.

2. In apparatus for representing in similitude the location of a body, a chart or representation of the field of movement thereof, means to indicate upon said chart or representation the position of said body, and means responsive to signals transmitted from said body to move said indicating means in accordance with movements of the body.

3. In apparatus for representing in miniature the location of a body, a chart or representation of the field of movement thereof, a pointer to indicate upon said chart or representation the position of the body, and radiodynamic means to move said pointer in accordance with movements of the body.

4. In apparatus for representing in miniature the location of a body, a chart or representation of the field of movement thereof, a pointer to indicate upon said chart or representation the position of the body, and radiodynamic means directively controlled by the position of said body, to move said pointer in accordance with movements of said body.

5. In apparatus for indicating visually the location of a body, a chart or representation of the field of movement of said body, means responsive to radiant energy transmitted from said body and positionable thereby in a predetermined direction with respect to said body, and coacting means positionable by said responsive means with relation to the chart or representation to indicate thereon the position of said body.

6. In apparatus for indicating visually the location of a body, a chart or representation of the field of movement of said body, means responsive to radiant energy transmitted from said body and positionable thereby in a predetermined direction with respect to said body, and electrically actuated means controlled by said responsive means to indicate upon said chart or representation the position of said body.

7. In apparatus for indicating visually the location of a body, a chart or representation of the field of movement of said body, means responsive to radiant energy transmitted from said body and positionable thereby in a predetermined direction with respect to said body, and coacting means positionable by said responsive means in parallelism to the latter and in predetermined relation to said chart or representation.

8. In apparatus for indicating visually the location of a body, a chart or representation of the field of movement of said body, means responsive to radiant energy transmitted from said body and positionable thereby in a predetermined direction with respect to said body, a pointer mounted to travel across said chart or representation, and operative connections between said pointer and said responsive means.

9. In apparatus for indicating visually the location of a body, a chart or representation of the field of movement of said body, means responsive to radiant energy transmitted from said body and positionable thereby in a predetermined direction with respect to said body, a pointer mounted to travel across said chart or representation, and an electric circuit between and operatively associated with said pointer and said responsive means.

10. In apparatus for indicating visually the location of a body, a chart or representation of the field of movement of said body, means responsive to radiant energy transmitted from said body and positionable thereby in a predetermined direction with respect to said body, a pointer mounted to travel across said chart or representation, and an electric circuit between and operatively associated with said pointer and said responsive means and having a resistance adapted to be varied by said responsive means.

11. In apparatus for indicating visually the location of a body, a chart or representation of the field of movement of said body, means responsive to radiant energy transmitted from said body and positionable thereby in a predetermined direction with respect to said body, a pair of pointers mounted to travel in opposition across said chart or representation, and means controlled by said responsive means to change the position of said pointers in accordance with changes in position of said body.

12. In apparatus for indicating visually the location of a body, a chart or representation of the field of movement of said body, means responsive to radiant energy transmitted from said body and positionable thereby in a predetermined direction with respect to said body, a pair of pointers mounted to travel in opposition across said chart or representation, and means controlled by said responsive means to change the position of said pointers in accordance with changes in directive position of said responsive means.

13. In apparatus for representing in similitude the location of a body, a chart or representation of the field of movement of said body, movable means responsive to radiant energy transmitted from said body and thereby to be turned toward it, and coacting means at said chart adapted to be turned by said responsive means into a position corresponding to that of the latter.

14. In apparatus for representing in similitude the location of a body, a chart or representation of the field of movement of said body, movable means responsive to radiant energy transmitted from said body and thereby to be turned toward it, coacting means at said chart adapted to be turned by said responsive means into a position corresponding to that of the latter, and electrical connections between said responsive means and said coacting means.

15. In apparatus for representing in similitude the location of a body, a chart or representation of the field of movement of said body, movable means responsive to radiant energy transmitted from said body and thereby to be turned toward it, coacting means at said chart adapted to be turned by said responsive means into a position corresponding to that of the latter, and an electric circuit connecting said coacting means and said responsive means and having a resistance varied in accordance with the movements of said responsive means.

16. In apparatus for representing in similitude the location of a body, a chart or representation of the field of movement of said body, a pair of movably mounted devices responsive to radiant energy transmitted from said body and thereby to be turned toward it, said devices being mounted at opposite sides of said body, a pair of pointers mounted to cross upon said chart, and means controlled by said responsive devices and operatively connected to said pointers to move the latter in accordance with movements of said responsive devices.

17. In apparatus for representing in similitude the location of a body, a chart or representation of the field of movement of said body, a pair of movably mounted devices responsive to radiant energy transmitted from said body and thereby to be turned toward it, said devices being mounted so that their planes of direction may intersect, a pair of pointers mounted for intersection upon said chart, and means controlled by said responsive devices to move said pointers in conformity with movements of said devices.

18. In apparatus for representing in similitude the location of a body, a chart or representation of the field of movement of said body, a pair of movably mounted devices responsive to radiant energy transmitted from said body and thereby to be turned toward it, said devices being mounted so that their planes of direction may intersect, a pair of pointers mounted for intersection upon said chart, and electric connections between said pointers and responsive devices to move the former in accordance with movements of the latter.

19. In apparatus for representing in similitude the location of a body, a chart or representation of the field of movement of said body, a pair of movably mounted devices responsive to radiant energy transmitted from said body and thereby to be turned toward it, said devices being mounted so that their planes of direction may intersect, a pair of pointers mounted for intersection upon said chart, and electric circuits between said pointers and responsive devices, having resistances adapted to be varied by and in accordance with the directive position of said responsive devices.

In testimony whereof, I have signed my name to this specification, in the presence of two subscribing witnesses.

JOHN HAYS HAMMOND, Jr.

Witnesses:
ELIZA A. RABARDY,
F. J. BEHN.